Patented Mar. 27, 1945

2,372,256

UNITED STATES PATENT OFFICE 2,372,256

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 23, 1943, Serial No. 492,182

5 Claims. (Cl. 252—337)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned, is of significant value in removing impurities, particularly inorganic salts, from pipeline oil.

The demulsifier or demulsifying agent employed in our present process consists of the sulfonic acid or sulfonic acid salt or ester of a hydroxy or alkoxy diaryl alkyl methane, in which at least 1 of the aryl groups contains at least one hydroxy radical, or at least, one nuclear substituted alkoxy radical, the alkyl radical of said alkoxy group having not over ten carbon atoms, and in which there is at least 1 nuclearly-linked fatty acid radical derived from an unsaturated fatty acid having at least 11 and not over 22 carbon atoms.

Considered in a broad generic sense, the type of aryl sulfonic acid just described, may be referred to as a Twitchell agent, or sulfo-fatty aromatic acid, or sometimes as a sulfo-aromatic fatty acid. Prior reference to the ester form concerns the carboxyl radical and not the sulfonic acid radical, as is apparent in light of subsequent description. One of the common procedures employed to manufacture sulfo-aromatic fatty acids is to employ a method in which the selected aromatic material and the selected unsaturated fatty acid such as oleic acid, is subjected to a sulfonation-condensation reaction. Such reaction involves the simultaneous introduction of the fatty acid radical into the aromatic nucleus, along with the simultaneous introduction of one or more sulfonic acid radicals. Thus, it is our preferred procedure to manufacture the herein contemplated compounds in the manner thus indicated. In light of this preference, it appears most convenient to describe suitable aromatic reactants which may be employed as raw materials.

In numerous instances, and in fact, it is preferred, to use the type of aromatic reactants in which there are present two phenylol groups, and additionally, two alkyl groups directly attached to the methane nucleus, as, for example, diphenylol dimethyl methane. Such latter reactant may be prepared in the following manner: Phenol is reacted with acetone (or diethyl ketone or methyl ethyl ketone), as described in U. S. Patent No. 1,225,748, of Wallace A. Beatty, to give the compound diphenylol dimethyl methane

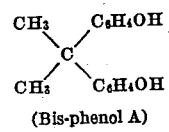

(Bis-phenol A)

or the corresponding diethyl or methyl ethyl compound. Alkyl radicals attached to methane carbon atom may be replaced by alkylene radicals. Furthermore, the non-aryl methane carbon atom substituents may be alicyclic or alkylaryl. The last mentioned raw material represents the type of phenyl-ketone condensation product known generically in the art as "bis-phenols," and are readily available and comparatively inexpensive. As to the manufacture of bis-phenols, reference is made to U. S. Patent No. 2,182,308, dated December 5, 1939, to Britton and Bryner. Bis-phenols have the general formula:

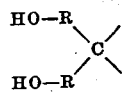

wherein R is an aryl group and the free bonds are linked with alkyl groups or an alkylene radical. They are commonly prepared by reacting a phenol, e. g., phenol, o-cresol, etc., with a ketone such as acetone, methyl ethyl ketone, dibenzyl ketone, cyclohexanone, etc., in the presence of a concentrated strong mineral acid such as sulfuric or hydrochloric acid. Any ketone, e. g., acetone, methyl ethyl ketone, diethyl ketone, dibutyl ketone, cyclohexanone, may be employed in the reaction, and also a variety of phenols can be used; for instance, phenol, o-cresol, o-chlorphenol, etc., are suitable. The aryl radical or radicals, may or may not contain a nuclear-substituted alkyl radical.

Similar reactants are derivable from a variety of other carbonyl-containing compounds, including ketones, in which the carbonyl oxygen is activated by the presence of a halogen as a substituent for a hydrogen atom, alpha-chlorinated aldehydes, etc. In the art relating to this type of compound they are sometimes described as "substituted methanes"; other times as "substituted 2,2 propanes." Although there is extensive literature dealing with this type of aromatic compound, reference is made only to a few additional patents, to wit: British Patent No. 274,439, to Chemische Fabrik Auf Actien; to British Patent No. 254,753, and British Patent No. 443,559, to I. G. Farbenindustrie, A. G.

Another suitable type of raw material is exemplified by p-Cumyl phenol

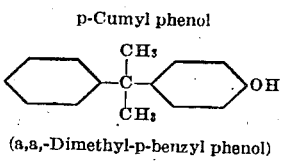

(a,a,-Dimethyl-p-benzyl phenol)

Having obtained a diaryl substituted methane of the type previously described and which may contain a nuclear-linked alkyl radical having not more than 10 carbon atoms, one need only subject such reactant to sulfonation, in the presence of a suitable unsaturated fatty acid, in order to obtain a material of the kind herein contemplated for use as such, or after neutralization, or esterification of the carboxyl radical. For instance, if one obtains a propylated or butylated or amylated bis-phenol A, or the equivalent, in which the propyl, butyl, or amyl group is directly attached to the aromatic nucleus, such compound need only be subjected to sulfonation, followed by the usual steps for elimination of the excess sulfonating agent, such as sulfuric acid, oleum, etc., in order to obtain a raw material which can be readily converted into a sulfoaromatic fatty compound. As pointed out subsequently, sulfonation and introduction of the fatty acid radical are preferably accomplished in a single step.

If, however, one employs a raw material in which there is no nuclear substituted alkyl radical, or if it is desirable to introduce an additional nuclear substituted alkyl radical or radicals, in order to have an alkylated or polyalkylated aromatic raw material, then it is preferable to employ a procedure of the kind commonly used in conversion of naphthalene to an alkylated naphthalene sulfonic acid. (For example, see U. S. Patent No. 2,309,935, dated February 2, 1943, to Claytor.) Briefly stated, the process consists in converting the aromatic material, for instance, bis-phenol A in the present instance, into a sulfonic acid. The sulfonic acid so obtained may be a polysulfonic acid, for intance, a di-, tri-, or tetra-sulfonic acid, but it is preferably a monosulfonic acid. Generally speaking, there is no advantage in introducing more than one sulfonic acid radical. Furthermore, it is immaterial whether one obtains one isomeric sulfonic acid, or another isomeric sulfonic acid, or a mixture. However, as suggested previously, and as pointed out subsequently, alkylation, sulfonation, and introduction of the fatty acid radical can be accomplished in a single step.

The alcohol employed, such as a methyl, ethyl, propyl, butyl, amyl, hexyl, or decyl alcohol, etc., is converted into the acid sulfate, such as propyl hydrogen sulfate. The aryl sulfonic acid and the alkyl hydrogen sulfate, are combined in proportions so that 1, 2, 3, or even 4 alkyl groups are introduced into the aromatic residue. This condensation reaction is generally carried out in the presence of an excess of sulfuric acid. Sulfuric acid may be of any suitable strength, and one preferably employs oleum. In some instances, the various reactions, such as sulfonation, sulfation, condensation, etc. are carried out simultaneously. Note what is said subsequently in regard to esterification also. Generally speaking, the dialkylated and trialkylated materials appear to yield a desirable type of raw material. The presence of some mono-alkylated material, or some tetra-alkylated material is not objectionable, and may even be desirable.

It is obvious, of course, that the alkylated groups introduced might be derived from olefines, such as ethylene, butylene, propylene, amylene, etc., insofar that such olefines react directly with sulfuric acid to produce the alkyl hydrogen sulfates. Of course, in addition to introducing such alkyl groups of the kind described into the aromatic nucleus or nuclei, one could also introduce an alkyl residue from some other alcohol, as, for example, an alkylated group derived from cyclohexyl, benzyl, or methyl alcohol. Such methyl group might be present in the event that the primary raw material employed happened to be a suitably selected cresol.

It is immaterial as to the particular alcohol employed, or the particular isomeric form of the alcohol employed, although generally speaking, it is most desirable to use the one lower or lowest in cost. It is immaterial whether one uses normal propyl alcohol, or isopropyl alcohol. It is immaterial whether one uses a normal butyl alcohol, or isobutyl alcohol. It is immaterial whether the alcohol be a primary alcohol, or a secondary alcohol, or a tertiary alcohol, or the like. This is true whether the alcohol is used in preparation of an intermediate, or in a single step involving the final material.

Previous reference has been made to the fact that an alkyl group containing not more than 10 carbon atoms, can be present in the aryl reactant. There is, of course, a definite limit to the selection of alkylated phenols as raw materials for condensation with a ketone or an aldehyde, in the manufacture of bis-phenols or the like. Basically, the reason relates to the activation of a nuclear hydrogen atom by the hydroxyl group, so that condensation with elimination of the carbonyl oxygen atom will take place. As has been previously pointed out, bis-phenols may be obtained from ortho substituted phenols. Thus, one might use orthobutyl phenol, orthoamyl phenol, etc. The products so obtained serve as raw materials for the manufacture of the sulfo-aromatic fatty compounds.

One may, of course, prepare a bis-phenol to be used as a raw material from unsubstituted phenols, so as to obtain a reactant of the kind exemplified by bis-phenol A. Such product contains no nuclear substituted alkyl radicals containing less than 10 carbon atoms. If, however, one subjects such reactant to some conventional reaction so as to introduce an alkyl radical, it may happen, and frequently does happen, that the alkyl radical enters at the phenolic hydroxyl hydrogen atom position, rather than at the nuclear position. Reference is made to reactions such as the Friedel and Crafts reaction, or any manner of a number of similar reactions, in which the alkylating agent is an alkyl halide containing less than 10 carbon atoms, such as propyl chloride, butyl chloride, octyl chloride, decyl chloride, etc. The condensation agent or catalyst may be exemplified by aluminum chloride, boron tri-fluoride, zinc chloride, sulfuric acid, or other equally well known reagents. In the briefest aspect, the two types of alkylations thus possible may be indicated as follows:

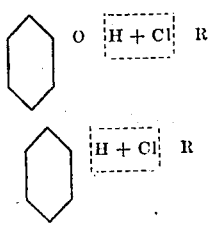

(Only one nuclear hydrogen atom shown.)

If one employs such alkylation reaction, one introduces either an alkyl group, or an alkoxy group. In light of the fact that such reactions are well known, it is not believed that a further description is necessary. Having obtained such suitable reactant by any of the procedures previously described, it is obvious that such reactant can then be subjected to a sulfonation process or procedure in the same manner as employed to sulfonate naphthalene, amyl naphthalene, butylated phenol, or the like. Such sulfonation step may be carried on with a minimum of sulfuric acid, or sulfonating agent, if conducted in the presence of an inert solvent which eliminates the water formed as a result of sulfonation. (See Journal of Industrial and Engineering Chemistry, volume 35, No. 3, page 326 (1943).) Again, attention is directed to the fact that the introduction of the fatty acid radical may take place at this same stage.

In any event, as a result of the procedures previously described, one obtains a sulfonic acid suitable for use as a material and containing, at the most, some excess sulfonating agent, and possibly, unchanged reactants. In the actual manufacture of alkylated aryl sulfonic acids, such as those herein contemplated, the sulfonation step is followed by a washing process which removes the excess of sulfuric acid or other sulfonation, sulfation, or condensation agents employed. Where a condensation agent, such as aluminum chloride or the like has been employed, it is customary to remove it, of course, prior to the sulfonation step. The sulfonation mass, briefly stated, is diluted with sufficient water so that the sulfonic acid resulting from sulfonation is insoluble in the more dilute acid. The diluted mass is allowed to stand in a quiescent state until separation takes place. The diluted lower acid also is withdrawn and discarded.

Previous reference has been made to the fact that the compounds herein contemplated are sulfo-aromatic fatty acids or salts or esters thereof, and although they may be manufactured in various ways, one particularly feasible procedure is to employ the method used for the production of Twitchell agents. Broadly speaking, such method contemplates reacting an aromatic material and a fatty acid in presence of the sulfonating and condensing agent. In light of what appears in the previous paragraphs, it is evident that one might introduce both the fatty acid radical and an alkyl radical, if desired, in the same reaction, along with the introduction of a sulfonic acid radical. In other words, one might adopt a procedure in which an aromatic material, such as bis-phenol A, an alcohol such as propyl alcohol, if desired, and a fatty acid, such as oleic acid, are simultaneously subjected to condensing and sulfonation. Under such circumstances, there may be a decided tendency for the carboxylic acid radical to esterify with the alcohol. This is not objectionable. One may, of course, use an increased proportion of the selected alcohol, such as propyl alcohol, or better still, one may first introduce the propyl group, and when such condensation is complete, one can then add the unsaturated fatty acid to the same reaction mass.

A sulfo-aromatic fatty acid, or its salt or carboxylic ester, may be prepared from sulfo-aromatic acid and an unsaturated fatty acid. In other words, one might react naphthalene sulfonic acid, or phenol sulfonic acid with oleic acid, in the presence of a condensing agent, such as strong sulfuric acid. However, there is no reason, ordinarily, why the two reactions, to wit, sulfonation and condensation, should not be carried out simultaneously. If desired, alkylation can also be carried out at the same time. Thus, instead of sulfonating the specific aromatic reactants previously described and subsequently mixing them with oleic acid, under appropriate conditions, it is more feasible to mix the unsulfonated aromatic reactant, such as bis-phenol A with oleic acid or the like, and subject the entire mass to a sulfonation-condensation reaction. Such procedure is most desirable, for a number of obvious reasons, and thus, will be illustrated by subsequent examples. Alkylation, such as propylation, can also take place, in the same operation. In view of the prior complete description, and the well known nature of the reactants and reaction, this is perfectly obvious to the skilled chemist.

As previously suggested, one class of reactants employed in the production of the herein described sulfo-aromatic fatty acids are higher unsaturated fatty acids, as exemplified by oleic acid. These unsaturated fatty acids vary in the number of carbon atoms present, from 11 to 22. For instance, unsaturated acids having 11 carbon atoms may be obtained by pyrolysis of castor oil or ricinoleic acid. Similar acids having as many as 20 to 22 carbon atoms are obtainable from jojoba bean oil, or from other naturally-occurring waxes. Better known examples are oleic acid, erucic acid, and the like. Some of the fatty acids may contain more than 1 ethylene linkage, as, for example, linoleic acid or linolenic acid. Furthermore, one may employ a naturally-occurring mixture of fatty acids, rather than a single specific acid. Our preference is to employ the monoethylenic acids.

In any event, the acidic mass resulting from a selected sulfonation-condensation reaction, or its equivalent, as employed in the manufacture of the herein described sulfo-aromatic fatty acid, is handled in the same manner previously noted in connection with a reaction wherein an alkyl radical or the like is introduced into an aromatic nucleus. In other words, the acidic mass is diluted, permitted to separate, and the acidic mass is esterified or neutralized. It may be neutralized in any convenient manner, with a suitable base, such as caustic soda, caustic potash, ammonium hydroxide, or the like. Certain amines, such as benzylamine, amylamine, cyclohexylamine, octadecylamine, etc., may be employed. The final product, if it represents a pasty, or solid, or semi-solid mass, is rendered useful for industrial use by the addition of a solvent, such as water, or an alcohol, a coal tar solvent, a petroleum hydrocarbon solvent, or by the use of any other suitable solvent, such as a phenolic body, or a chlorinated hydrocarbon.

Before washing the acidic mass, one may add a suitable alcohol, and particularly, a low molal aliphatic alcohol, such as methyl alcohol, ethyl alcohol, propyl alcohol, butyl alcohol, amyl alcohol, octyl alcohol, decyl alcohol, or even a high molal alcohol, such as hexadecyl alcohol, octadecyl alcohol, etc. or any isomer thereof and permit esterification to take place by reaction with the carboxyl radical. The sulfuric acid or oleum used as a sulfonation-condensation agent, also acts as an esterifying agent to permit the indicated reaction. It is probable that the reaction is also accelerated by the presence of a large amount of sulfonic acid. Other alcohols, such as alicyclic alcohols, aralkyl alcohols, including benzyl alcohol, ethylbenzyl alcohol, cyclohexyl alcohol, ethylcyclohexyl alcohol, etc. may be used.

In light of what has been said in the previous paragraph, in regard to esterification, it is obvious that if one desires a compound or a mixture in which the carboxylic radical is esterified to a greater or lesser degree with an alcohol such as propyl alcohol, butyl alcohol, or one of the other alcohols previously described, it is possible to conduct three or four reactions simultaneously. The ultimate product must involve at least sulfonation and the introduction of a fatty acid radical. The ultimate product may also involve the introduction of an alkyl radical in the aromatic nucleus. If esterification is also involved, and many of the most desirable compounds are obtained at least by the partial esterification of the carboxyl radical, then, in that event, all four reactions of the kind described, to wit:

(a) Sulfonation;
(b) Alkylation;
(c) Nuclear introduction of a fatty acid radical; and
(d) Esterification of the fatty acid carboxyl, may take place in the single operation procedure. All of this is obvious, in view of what has been said previously, but will be elaborated on by subsequent examples.

*Example 1*

1 pound mole of di-phenylol dimethyl methane (bis-phenol A) is mixed with 1 pound mole of oleic acid hydrogen-hydrogen sulfate, prepared by reacting 1 pound mole of oleic acid with 1½ to 2 pound moles of sulfuric monohydrate and immediately employing the mixture thus obtained. 1 to 2 pound moles of sulfuric acid 96% or weak oleum are added. The mass is stirred constantly at a temperature which precludes the formation of any significant amount of sulfur trioxide. A temperature of 35–55° C., or as high as 75° C., if need be, is particularly suitable and the mass may be stirred for approximately 3–10 hours, until tests indicate that both the sulfonation reaction and the condensation reaction are complete. The sulfonated mass is then diluted with water until it shows a tendency to separate readily. It is then permitted to remain in a quiescent state, until such separation is complete. The lower layer of dilute acid is withdrawn and the acidic mass is neutralized so that no free sulfonic acid hydrogen remains, but the carboxylic hydrogen atom remains unneutralized. Generally speaking, this means neutralization to the methyl orange end point. Any suitable base may be employed. Such basic materials include caustic soda, caustic potash, ammonium hydrate, triethanolamine, oxyethylated triethanolamine, derived by treating triethanolamine with ethylene oxide, oxyethylated tris-(hydroxymethyl) aminomethane derived by treating tris-(hydroxymethyl) aminomethane with ethylene oxide. These bases enhance water solubility.

*Example 2*

The same procedure is followed as in Example 1, preceding, except that para-cumyl-phenol is used as a reactant instead of bis-phenol A.

*Example 3*

The same procedure is followed as in Example 1, preceding, except that phenyl-phenylol-methyl methane of the following composition:

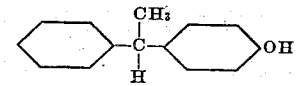

is used to replace bis-phenol A.

*Example 4*

The same procedure is used as in Example 1, preceding, except that a butylated bis-phenol A, obtained by reacting orthomonobutyl phenol with acetone in the manner described in the aforementioned Britton and Bryner patent, is employed instead of bis-phenol A.

*Example 5*

A bis-phenol, obtained from phenol and dibenzylketone, is employed in place of bis-phenol A, in Example 1, preceding.

*Example 6*

A bis-phenol, derived from cyclohexanone and phenol, is used to replace bis-phenol A in Example 1, preceding.

*Example 7*

1 pound mole of di-phenylol dimethyl methane (bis-phenol A) is mixed with 1 pound mole of propyl hydrogen sulfate and 1 pound mole of oleic acid, hydrogen-hydrogen sulfate, 2 to 3 pound moles of sulfuric acid 96%, or weak oleum are added. The mass is stirred constantly at a temperature varying from 35 to 55° C., or as high as 75° C., if need be, for approximately 3–10 hours, until tests indicate that both sulfonation reaction and condensation reaction are complete. The sulfonated mass is then diluted with water until it shows a tendency to separate readily. It is then permitted to remain in a quiescent state until such separation is complete. The lower layer of dilute acid is withdrawn and the acidic mass neutralized with a base which enhances, or, at least, does not markedly reduce water solubility. Such basic materials include caustic soda, caustic potash, ammonium hydrate, triethanolamine, oxyethylated triethanolamine, derived by treating triethanolamine with ethylene oxide, oxyethylated tris(hydroxymethyl) aminomethane, derived by treating tris(hydroxymethyl) aminomethane with ethylene oxide, etc.

*Example 8*

The same procedure is followed as in Example 7, preceding, except that 2–4 moles of propyl hydrogen sulfate are employed for each mole of the aryl reactant.

*Example 9*

The same procedure is followed as in Example 7, preceding, except that butyl hydrogen sulfate, amyl hydrogen sulfate, hexyl hydrogen sulfate, or octyl hydrogen sulfate, is substituted in place of propyl hydrogen sulfate.

*Example 10*

The same procedure is followed as in Example 7, preceding, except that a mixture of at least two different alkyl hydrogen sulfates are employed in each instance. For example, a mixture of propyl hydrogen sulfate and butyl hydrogen sulfate, or butyl hydrogen sulfate and amyl hydrogen sulfate, or propyl hydrogen sulfate and amyl hydrogen sulfate, are used.

Example 11

In the previous examples where a cumyl phenol or a bis-phenol is subjected to condensation with an alkyl hydrogen sulfate, in the presence of sulfuric acid, there is employed instead a conventional Friedel & Crafts reaction, involving one mole of the selected aryl reactant and 1 to 4 moles of an alkyl halide, for instance, propyl chloride, butyl chloride, amyl chloride, hexyl chloride, octyl chloride, and decyl chloride, in the presence of aluminum chloride, so as to cause condensation. After completion of the condensation, conducted in the conventional manner, the aluminum chloride is removed by customary procedure, such as by extraction of the organic matter by ether, prior to or after treatment with water, steam distillation, or hydrolysis in the presence of added hydrochloric acid, followed by extraction, or distillation, or other equivalent procedure.

Example 12

The same procdure is followed as in Examples 1–11, preceding, except that erucic acid is employed instead of oleic acid.

Example 13

The same procedure is followed as in Examples 1–11, preceding, except that the mixed fatty acids derived from sunflowerseed oil or teaseed oil, are used instead of oleic acid.

Example 14

The same procedure is followed as in Examples 1–13, preceding, except that the acidic mass is employed, as such, or after neutralization with a base which tends to reduce water solubility, and in fact, may result in a compound which is either oil-soluble, or almost water-insoluble, or completely water-insoluble, or may show extreme water-solubility in either water or oil. Among the suitable bases for such purposes are: pyridine, cyclohexylamine, dicyclohexylamine, benzylamine, di-benzylamine, amylamine, diamylamine, tri-amylamine, octadecylamine, and particularly high molal amines, which, in the form of the acetate, show surface activity.

Example 15

The same procedure is followed as in Examples 1 to 13, preceding, except that the final product, as far as the sulfonic radical is concerned, is converted into the salt of a quaternary ammonium base. The particular ammonium bases employed are characterized by the type in which salts having a low molal anion are surface-active, i. e., quaternary bases of the kind that the chloride, nitrite, bromide, acetate, lactate, and the like, show surface-activity in aqueous solution. Generally speaking, such quaternary compounds are more apt to be available in the form of salts, for instance, a chloride or bromide, rather than in the form of the free base. In light of this fact, salts of the kind herein contemplated, i. e., sulfonates, are best obtained metathetically. The two conventional procedures for such metathetical reactions involve preparing the sodium, potassium, the ammonium salt of the sulfonic acids previously described, and then reacting an alcoholic solution of such salts with an alcohol solution of the quaternary chloride or bromide. Another procedure involves the principle that the combination of a surface-active anion and surface-active cation is apt to produce a salt which is insoluble in water, in the absence of an excess of either reactant. Thus, an aqueous solution of the sodium, potassium, or ammonium salt of the kind described in the preceding examples may be reacted in dilute solution, for instance, 5% with a 5% solution of cetyl pyridinium bromide, or any one of a number of other surface-active quaternary halides, as, for example, those described in our co-pending application Serial No. 463,439, filed October 26, 1942.

Example 16

The same procedure is followed as in Examples 1–15, preceding, except that the carboxyl radical is converted into a hydrophile group by neutralization with caustic soda, caustic potash, ammonium hydroxide, or any one of a number of hydroxylated amines or the like which enhance water solubility.

Example 17

The same procedure is followed as in Example 16, preceding, except that the amine used to react with the carboxyl radical is one of the kind which decreases water solubility, such as amylamine, cyclohexylamine, benzylamine, etc.

Example 18

The same procedure is followed as in the preceding examples, insofar as the production of the acidic mass, containing the sulfo-aromatic resultant is concerned, but prior to any washing or diluting step. At this point the acidic mass, prior to dilution, is mixed with a low molal alcohol, such as ethyl alcohol, propyl alcohol, butyl alcohol, or the like, in such amounts that there is present at least 2 moles of the selected alcohol for each carboxyl radical. The acidic mass is stirred until uniform, and then sulfuric acid, 96% strength, is added in amounts equivalent to 3 moles of sulfuric acid for each mole of alcohol added. The alcohols added are anhydrous, or preferably, substantially anhydrous. The acidic mass so obtained is permitted to stand for approximately 3–10 days at approximately 20–35° C., until the esterification reaction is substantially complete, as indicated by substantial disappearance of free carboxyl radicals. The acidic mass is then separated in the conventional manner previously described, and the sulfonic acid radical and any residual carboxyl radical present are neutralized by means of any one of the bases previously indicated, which may be of the type that enhance water solubility, or decrease water solubility. The excess of low molal alcohol present is permitted to remain or be removed by distillation.

Attention is directed to another variation or sub-genus which is particularly valuable. Such sub-genus or sub-division is obtained by oxyethylation of the aryl compound. Oxyethylation is conducted by means of compounds having a reactive ethylene oxide ring, such as, for example, ethylene oxide, propylene oxide, butylene oxide, etc. If such oxyethylation is conducted prior to a Friedel & Crafts reaction, it is obvious that the alkyl group introduced is attached to the nuclear carbon atom by an oxyethylene radical or a polyoxyethylene radical. Similarly, the hydroxyl group, after oxyethylation, represents a similar situation in which the hydrogen bond is interrupted by an oxyalkylene radical, or a polyoxyalkylene radical. In any event, the number of oxyalkylene radicals introduced is limited so that water solubility is not obtained in the absence of a sulfonic group. Generally speaking, this means that the polyoxyalkylene radical appearing between a nuclear carbon atom and a hydrogen atom, or between a nuclear carbon atom and an alkyl radical, will contain not over 10 ether linkages. This relationship is indicated in the following manner, the arrow indicating oxyalkylation, and more particularly, oxyethylation.

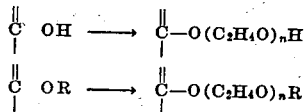

in which $n$ is the numeral 9 or less. The second type is obtained most advantageously by replacing the terminal hydrogen in the first type by an alkyl condensation reaction, such as a Friedel & Crafts reaction, or some of the others previously referred to. (See our co-pending application Serial No. 478,597, filed March 9, 1943.)

If desired, the carboxylic radical may be neutralized, i. e., converted into the salt form by means of the various bases previously suggested in connection with neutralization of the sulfonic acid radical.

Summarizing what has been said, the type of compound herein contemplated may be exemplified by the following formula:

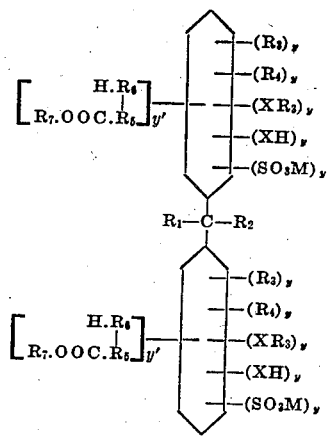

in which $R_1$ is a member of the class selected from alkyl, alicyclic and alkylaryl radicals; $R_2$ is a member selected from the class consisting of alkyl, alicyclic and alkylaryl radicals and hydrogen atoms; $R_3$ is an alkyl radical containing not over 10 carbon atoms; $R_4$ is an alkyl radical containing not over 2 carbon atoms;

is the fatty acid residue of the unsaturated fatty acid $R_6=R_5COOH$, and $R_7$ is a member of the class of aliphatic hydrocarbon radicals, alicyclic hydrocarbon radicals, arylalkyl hydrocarbon radicals and cations, including hydrogen; M is a cation including hydrogen; X is a member of the class consisting of oxygen atoms; oxyalkylene radicals in which the alkylene radical does not contain more than 4 carbon atoms, and polyoxyalkylene radicals in which the alkylene does not contain more than 4 carbon atoms, and the ether linkage does not appear more than 10 times; and $y$ is a small whole number including zero; $y'$ is a zero or one, with the proviso that there must be at least one occurrence of

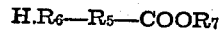

at least one occurrence of X and at least one occurrence of $SO_3M$.

In examining the previous formula, it is apparent that the radical

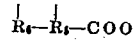

is the fatty acid residue of the unsaturated fatty acid

In the reaction of the kind noted, the double bond of the fatty acid radical becomes saturated by the introduction of the aromatic nucleus, and the nuclear hydrogen atom. Actually, it is immaterial whether the nuclear hydrogen atom attaches itself to radical $R_6$ and the aryl radical to $R_5$, or inversely, the hydrogen atom to $R_6$ and the aryl radical to $R_5$. One form is simply the metamer of the other form. Any isomeric or metameric form is equally satisfactory. It is understood that the formulas in the hereto appended claims include all isomeric, and particularly, all metameric forms. Any ordinary oleic acid ethylene linkage appears at the 9–10 carbon atom position. With other unsaturated acids the position might vary. The formula brings out clearly the fact that the fatty acid radical is nuclearly linked so as to present a branch chain arrangement.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

The chemical products or compounds herein described constitute the subject-matter of our divisional application Serial No. 530,044, filed April 7, 1944.

Having thus described our invention, what we claim as new and desire to secure by Letters Patent is:

1. A process for breaking petroleum emulsions of the water-in-oil type, which consists in subjecting the emulsion to the action of a demulsifier comprising a diaryl substituted methane sulfonate, in which the aryl radicals are monocyclic and the sulfonic acid radical is nuclearly linked, and of the formula:

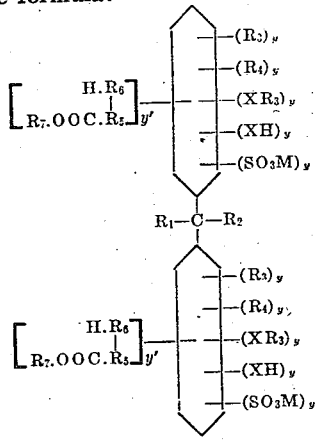

in which $R_1$ is selected from the class consisting of alkyl, alicyclic and alkylaryl radicals; $R_2$ is a member selected from the class consisting of alkyl, alicyclic and alkylaryl radicals and hydrogen atoms; $R_3$ is an alkyl radical containing not over 10 carbon atoms; $R_4$ is an alkyl radical containing not over 2 carbon atoms;

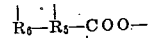

is the fatty acid residue of the unsaturated higher fatty acid

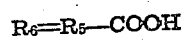

and $R_7$ is selected from the class consisting of aliphatic hydrocarbon radicals, alicyclic hydrocarbon radicals, arylalkyl hydrocarbon radicals, and cations, including hydrogen; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero; $y'$ is a zero or one, with the proviso that there must be at least one occurrence of $H.R_6—R_5.COO.R_7$, at least one occurrence of X and at least one occurrence of $SO_3M$.

2. A process for breaking petroleum emulsions of the water-in-oil type, which consists in subjecting the emulsion to the action of a demulsifier comprising a diaryl substituted monosulfonate, in which the aryl radicals are monocyclic and the sulfonic acid radical is nuclearly linked, and of the formula:

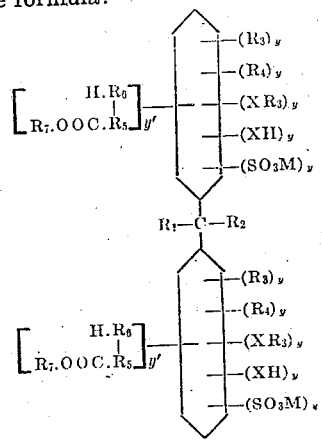

in which $R_1$ is selected from the class consisting of alkyl, alicyclic and alkylaryl radicals; $R_2$ is a member selected from the class consisting of alkyl, alicyclic and alkylaryl radicals and hydrogen atoms; $R_3$ is an alkyl radical containing not over 10 carbon atoms; $R_4$ is an alkyl radical containing not over 2 carbon atoms;

is the fatty acid residue of the unsaturated higher fatty acid

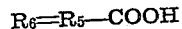

and $R_7$ is selected from the class consisting of aliphatic hydrocarbon radicals, alicyclic hydrocarbon radicals, arylalkyl hydrocarbon radicals, and cations, including hydrogen; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero; $y'$ is a zero or one, with the proviso that there must be at least one occurrence of $R_3$ and at least one occurrence of $H.R_6—R_5.COO.H_7$.

3. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical is nuclearly linked, and of the formula:

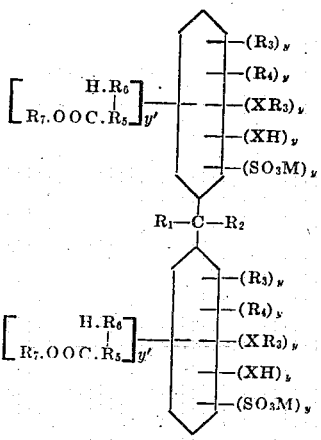

in which $R_1$ and $R_2$ are methyl radicals; $R_3$ is an alkyl radical containing not over 10 carbon atoms; $R_4$ is an alkyl radical containing not over 2 carbon atoms:

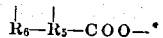

is the fatty acid residue of the unsaturated higher fatty acid $$R_6=R_5-COOH$$

and $R_7$ is selected from the class consisting of aliphatic hydrocarbon radicals, alicyclic hydrocarbon radicals, arylalkyl hydrocarbon radicals, and cations, including hydrogen; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero; $y'$ is a zero or one, with the proviso that there must be at least one occurrence of $H.R_5-R_6.COOR_7$ and at least one occurrence of X.

4. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical is nuclearly linked, and of the formula:

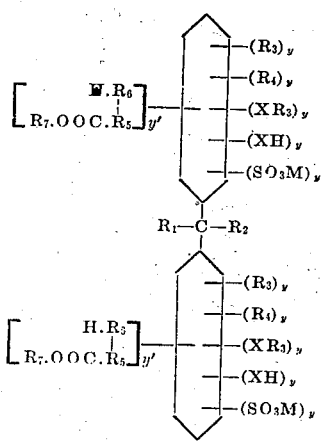

in which $R_1$ and $R_2$ are ethyl radicals; $R_3$ is an alkyl radical containing not over 10 carbon atoms; $R_4$ is an alkyl radical containing not over 2 carbon atoms;

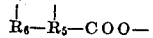

is the fatty acid residue of the unsaturated higher fatty acid $$R_6=R_5-COOH$$

and $R_7$ is selected from the class consisting of aliphatic hydrocarbon radicals, alicyclic hydrocarbon radicals, arylalkyl hydrocarbon radicals, and cations, including hydrogen; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero; $y'$ is a zero or one, with the proviso that there must be at least one occurrence of $H.R_5-R_6.COOR_7$ and at least one occurrence of X.

5. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical is nuclearly linked, and of the formula:

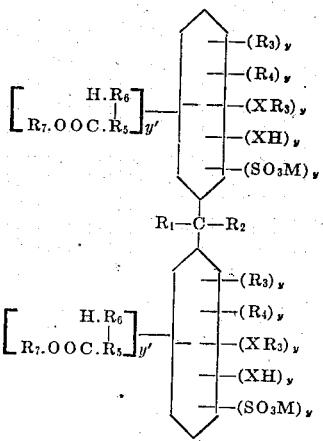

in which $R_1$ is a methyl radical and $R_2$ is an ethyl radical; $R_3$ is an alkyl radical containing not over 10 carbon atoms; $R_4$ is an alkyl radical containing not over 2 carbon atoms;

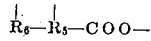

is the fatty acid residue of the unsaturated higher fatty acid $$R_6=R_5-COOH$$

and $R_7$ is selected from the class consisting of aliphatic hydrocarbon radicals, alicyclic hydrocarbon radicals, arylalkyl hydrocarbon radicals, and cations, including hydrogen; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero; $y'$ is a zero or one, with the proviso that there must be at least one occurrence of $H.R_5-R_6.COOR_7$ and at least one occurrence of X.

MELVIN DE GROOTE.
BERNHARD KEISER.